US012346047B2

(12) United States Patent
Tsujimoto et al.

(10) Patent No.: US 12,346,047 B2
(45) Date of Patent: Jul. 1, 2025

(54) IMAGE FORMING APPARATUS WITH REDUCED NUMBER OF CONNECTION LINES

(71) Applicant: BROTHER KOGYO KABUSHIKI KAISHA, Nagoya (JP)

(72) Inventors: Yoshiyuki Tsujimoto, Nagoya (JP); Nobuyuki Tanaka, Konan (JP); Yasuhiro Suzuki, Nagoya (JP); Wataru Yamaguchi, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/618,445

(22) Filed: Mar. 27, 2024

(65) Prior Publication Data

US 2024/0329581 A1 Oct. 3, 2024

(30) Foreign Application Priority Data

Mar. 30, 2023 (JP) ................................ 2023-056309

(51) Int. Cl.

*G03G 15/00* (2006.01)
*G03G 15/20* (2006.01)
*G03G 21/16* (2006.01)

(52) U.S. Cl.

CPC ..... *G03G 15/2064* (2013.01); *G03G 15/5004* (2013.01); *G03G 15/751* (2013.01); *G03G 21/1652* (2013.01); *G03G 2215/00354* (2013.01)

(58) Field of Classification Search

CPC .......... G03G 15/2064; G03G 15/5004; G03G 15/751; G03G 21/1652
USPC .................................... 399/88, 90, 320, 328
See application file for complete search history.

(56) References Cited

U.S. PATENT DOCUMENTS 10,705,476 B2 * 7/2020 Suzuki .................. G03G 15/80

FOREIGN PATENT DOCUMENTS

JP 2021-113856 A 8/2021

* cited by examiner

*Primary Examiner* — Hoan H Tran
(74) *Attorney, Agent, or Firm* — Merchant & Gould P.C.

(57) ABSTRACT

An image forming apparatus includes a main body housing, a main body connector, a fuser having a fuser connector, a power supply board, and a main board. The fuser connector is disposed at a first end section in the main body housing with the fuser attached to the main body housing. The main board is disposed at a second end section opposed to the first end section in the main body housing. The power supply board is connected with the main board via a first connection line disposed close to and along a ceiling surface or a bottom surface in the main body housing, and is connected with the main body connector via a second connection line. The main board is connected with the fuser via the first connection line, the power supply board, the second connection line, the main body connector, and the fuser connector.

9 Claims, 8 Drawing Sheets

IMAGE FORMING APPARATUS WITH REDUCED NUMBER OF CONNECTION LINES

REFERENCE TO RELATED APPLICATIONS

This application claims priority from Japanese Patent Application No. 2023-056309 filed on Mar. 30, 2023. The entire content of the priority application is incorporated herein by reference.

BACKGROUND ART

A removable fuser has been known that is configured to, even when contact failure occurs at contact points of a drawer connector for connecting signal lines of a temperature detector and a set detector of the removable fuser with the main body of an image forming apparatus, transmit correct detection signals from the detectors and prevent resulting failures.

SUMMARY

In the meantime, when a connector to connect the fuser with the image forming apparatus and a power supply board to apply voltage to a process unit are disposed on one side face (hereinafter referred to as a "first side face") of the main body of the image forming apparatus, and a main board is disposed on the other side face (hereinafter referred to as a "second side face") of the main body of the image forming apparatus, the main board and the power supply board are connected with each other via a harness traversing from the first side face to the second side face of the main body of the image forming apparatus. In this case, the power supply board and the connector are connected with each other via another harness. The main board and the connector are connected with each other via yet another harness traversing from the first side face to the second side face of the main body of the image forming apparatus.

Aspects of the present disclosure are advantageous for providing one or more improved techniques that make it possible to omit a harness that connects a main board and a connector and traverses from one side face of the main body of an image forming apparatus to the other side face thereof.

According to aspects of the present disclosure, an image forming apparatus is provided, which includes a main body housing, an image forming engine, a main body connector, a fuser, a power supply board, a main board, a first connection line, and a second connection line. The image forming engine is configured to form a developer image on a sheet. The main body connector is disposed at a first end section in the main body housing. The first end section is an end section close to a first side face of the main body housing in a particular direction. The fuser is configured to be removably attached to the main body housing and to thermally fix the developer image formed on the sheet. The fuser includes a heating member, a pressurizing member, and a fuser connector. The heating member has a heater. The pressurizing member is configured to sandwich the sheet in pressure contact between the pressurizing member and the heating member. The fuser connector is configured to connect with the main body connector when the fuser is attached to the main body housing. The fuser connector is disposed at the first end section in the main body housing when the fuser is attached to the main body housing. The power supply board is configured to generate voltage to be applied to the image forming engine. The power supply board is disposed at the first end section in the main body housing in such a manner that a board surface of the power supply board is parallel to the first side face of the main body housing. The main board has a controller configured to control the image forming engine. The main board is disposed at a second end section in the main body housing, in such a manner that a board surface of the main board is parallel to a second side face of the main body housing. The second end section is an end section close to the second side face of the main body housing in the particular direction. The second side face is opposed to the first side face in the particular direction. The first connection line is configured to connect the main board and the power supply board with each other. The first connection line is disposed close to and along a ceiling surface or a bottom surface in the main body housing. The second connection line is configured to connect the power supply board and the main body connector with each other. The main board is connected with the fuser via the first connection line, the power supply board, the second connection line, the main body connector, and the fuser connector.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
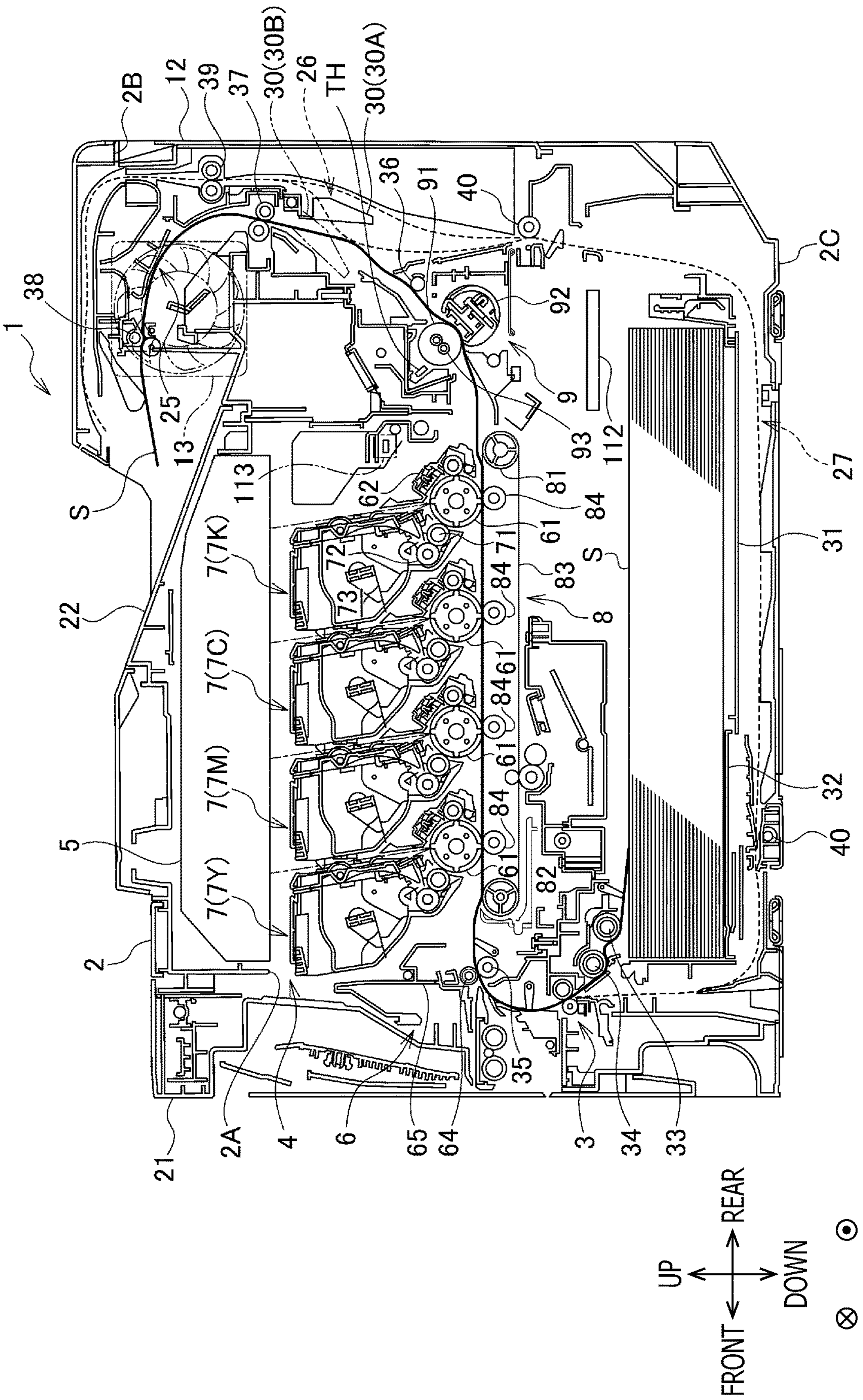
FIG. 1 is a cross-sectional side view schematically showing a color laser printer.

FIG. 1 is a cross-sectional side view schematically showing a configuration of a color laser printer 1 in an illustrative embodiment according to aspects of the present disclosure. The color laser printer 1 may be an example of an "image forming apparatus" according to aspects of the present disclosure. Hereinafter, the color laser printer 1 may be simply referred to as the printer 1. The printer 1 includes a main body housing 2, a conveyor 3, a process unit 4, and a fuser 9. In the following description, for the sake of explanatory convenience, vertical directions (i.e., an upward direction and a downward direction) and front-rear directions (i.e., a frontward direction and a rearward direction) of the printer 1 are defined as indicated by arrows in FIG. 1. In addition, a front side (i.e., a near side) and a back side (i.e., a far side) with respect to an image-drawn surface of FIG. 1 are defined as a right side and a left side of the printer 1, respectively. It is noted that hereinafter, one of the vertical directions (i.e., the upward direction and the downward direction) may be referred to as the "vertical direction" as a representative of the upward and downward directions when both of the upward and downward directions are acceptable, for the sake of explanatory simplicity. Likewise, one of the front-rear directions (i.e., the frontward direction and the rearward direction) may be referred to as the "front-rear direction." Further, one of the left-right directions (i.e., the leftward direction and the rightward direction) may be referred to as the "left-right direction."

The main body housing 2 has a front cover 21, a rear cover 12, a feed tray 31, a discharge tray 22, and first to third conveyance paths 25 to 27. The front cover 21 is configured to open and close a front opening 2A formed at a front portion of the main body housing 2. The front cover 21 is attached to a front face of the main body housing 2 in an openable and closeable state. The rear cover 12 is configured to open and close a rear opening 2B formed at a rear portion of the main body housing 2. The rear cover 12 is attached to a rear face of the main body housing 2 in an openable and closeable state. The feed tray 31 is removably attached to a lower portion of the main body housing 2. The feed tray 31 is configured to support sheets S placed thereon. The sheets S are fixed-size (e.g., A4-size) sheets. Examples of the sheets S may include, but are not limited to, paper media (e.g., plain paper and cardboard) and transparencies (e.g., OHP films). The discharge tray 22 is disposed at an upper portion of the main body housing 2. The discharge tray 22 is configured to receive discharged sheets S with images formed thereon.

Figure 6:
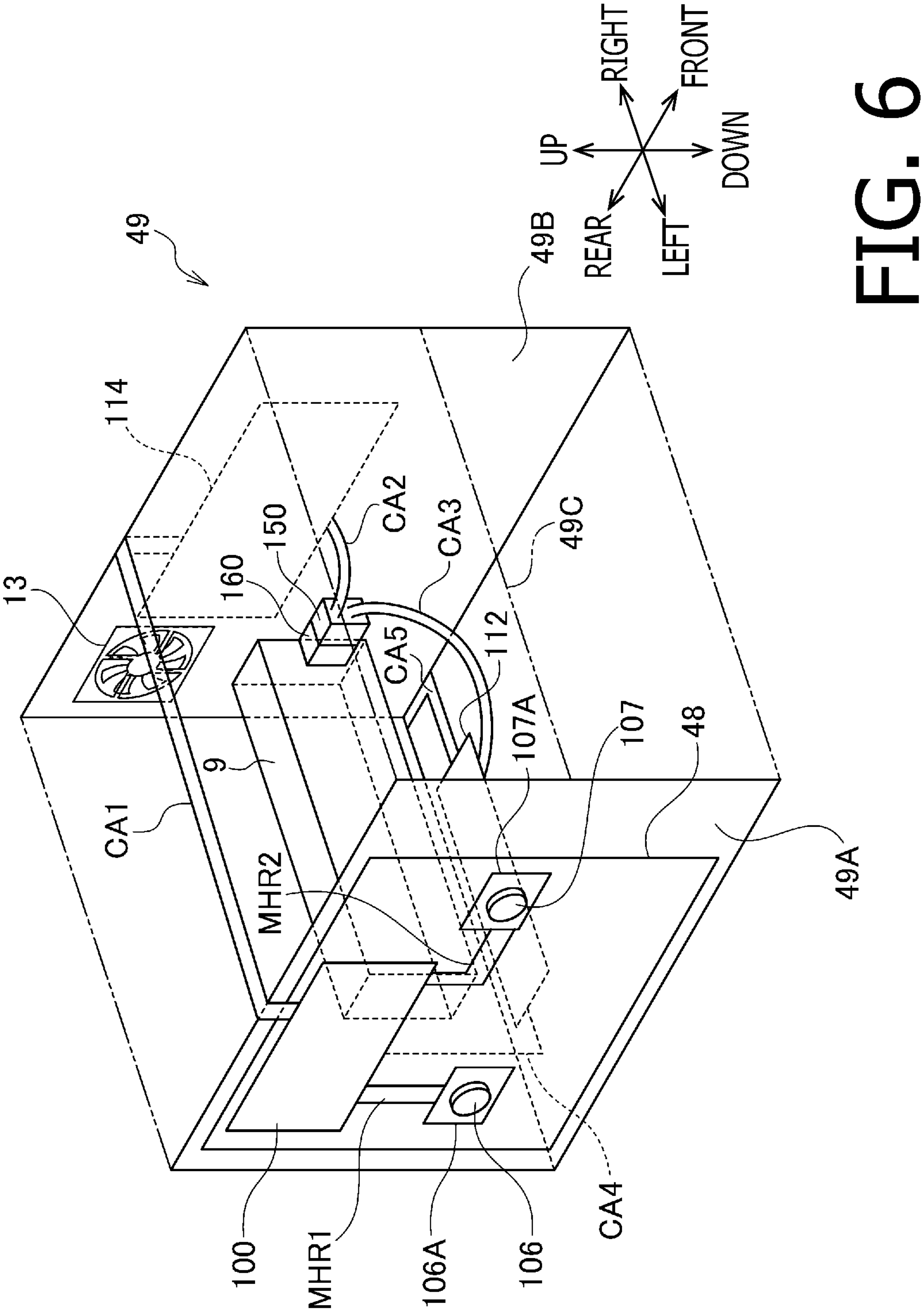
FIG. 6 is a perspective view schematically showing a configuration of a main body frame of the color laser printer.

The conveyor 3 includes a pick-up roller 33, a separation roller 34, a registration roller 35, a first conveyance roller 36, a second conveyance roller 37, a first switchback roller 38, a second switchback roller 39, a plurality of third conveyance rollers 40, a flapper 30 and a main motor 106 (see FIG. 6). A part of the second conveyance path 26 is formed by the closed rear cover 12.

The pick-up roller 33 is configured to pick up sheets S that are in the feed tray 31 and pushed upward by a sheet pressing plate 32 and to convey the picked-up sheets S toward the first conveyance path 25. The separation roller 34 is configured to separate the sheets S picked up by the pick-up roller 33 on a sheet-by-sheet basis.

The registration roller 35 is disposed upstream of the process unit 4 in a conveyance direction, along the first conveyance path 25. The registration roller 35 is configured to perform s skew correction for a sheet S and then convey the sheet S toward the process unit 4. The conveyance direction in which the registration roller 35 conveys the sheet S is a direction from front to back.

With the rear cover 12 closed when the sheet S is conveyed out of the main body housing 2, the conveyor 3 conveys the sheet S fed from the process unit 4, by the first conveyance roller 36, and guides the sheet S to the first conveyance path 25 by the flapper 30 (30A). Afterward, the conveyor 3 conveys the sheet S guided to the first conveyance path 25, by the second conveyance roller 37 and the first switchback roller 38, and discharges the sheet S onto the discharge tray 22.

With the rear cover 12 opened when the sheet S is conveyed out of the main body housing 2, the conveyor 3 conveys the sheet S fed from the process unit 4, by the first conveyance roller 36, guides the sheet S rearward by the flapper 30 (30B) that has swung to a position indicated by an imaginary line, and then discharges the sheet S through the rear opening 2B onto the open rear cover 12. The printer 1 is configured to perform image formation on the sheet S even when the rear cover 12 is open. The rear cover 12 is configured to, when opened, allow the sheet S with an image formed thereon to be discharged through the rear opening 2B.

To convey the sheet S to the process unit 4 again, the conveyor 3 conveys the sheet S fed from the process unit 4, by the first conveyance roller 36, and guides the sheet S to the first conveyance path 25 or the second conveyance path 26 by the flapper 30. When the sheet S has been guided to the first conveyance path 25, the conveyor 3 conveys the sheet S in the first conveyance path 25 to the third conveyance path 27 by the second conveyance roller 37 and the first switchback roller 38. When the sheet S has been guided to the second conveyance path 26, the conveyor 3 conveys the sheet S in the second conveyance path 26 to the third conveyance path 27 by the second switchback roller 39.

The sheet S conveyed to the third conveyance path 27 is again fed to the process unit 4 by the third conveyance roller 40 and the registration roller 35. Then, the sheet S, after an image has been formed thereon by the process unit 4, is discharged onto the discharge tray 22 by the conveyor 3.

The process unit 4 is configured to form an image on the sheet S by transferring a toner image onto the sheet S. The process unit 4 includes an exposure device 5, a drum unit 6, four developing cartridges 7Y, 7M, 7C, and 7K, and a transfer unit 8.

The exposure device 5 is disposed at an upper section in the main body housing 2. The exposure device 5 includes a light source, a polygon mirror, lenses, and a reflector, which are not shown in any drawings. The exposure device 5 is configured to expose surfaces of photoconductive drums 61 by emitting a light beam, indicated by an alternate long and short dash line, onto the surface of each photoconductive drum 61.

The drum unit 6 is disposed between the feed tray 31 and the exposure device 5 in the main body housing 2. The drum unit 6 includes the four photoconductive drums 61, four chargers 62, a pinch roller 64, and a support frame 65 configured to support the photoconductive drums 61. The drum unit 6 is configured to be attached to and removed from the main body housing 2 through the front opening 2A in a state where the front cover 11 is open. The pinch roller 64 is disposed to face the registration roller 35. The pinch roller 64 is configured to rotate in accordance with the rotation of the registration roller 35 and convey the sheet S together with the registration roller 35.

The developing cartridges 7Y, 7M, 7C, and 7K correspond to the four colors yellow (Y), magenta (M), cyan (C), and black (K), respectively. The developing cartridges 7Y, 7M, 7C, and 7K are removably attached to the drum unit 6 and arranged in this order from the front to the rear of the printer 1. Each of the developing cartridges 7Y, 7M, 7C, and 7K includes a developing roller 71, a supply roller 72, and a toner container 73. The developing cartridges 7Y, 7M, 7C, and 7K have different toner colors but have substantially the same configuration other than the toner colors. Therefore, one of the developing cartridges 7Y, 7M, 7C, and 7K may hereinafter be referred to as the "developing cartridge 7" as a representative of the developing cartridges 7Y, 7M, 7C, and 7K.

The transfer unit 8 is disposed between the feed tray 31 and the drum unit 6 in the main body housing 2. The transfer unit 8 includes a driving roller 81, a driven roller 82, a conveyor belt 83, and four transfer rollers 84. The conveyor belt 83 is wound around the driving roller 81 and the driven roller 82. An upward-facing surface of the conveyor belt 83 is in contact with the photoconductive drums 61. The four transfer rollers 84 are disposed within a portion surrounded by the conveyor belt 83 in such a manner as to sandwich the conveyor belt 83 between each transfer roller 84 itself and a corresponding photoconductive drum 61.

The fuser 9 is disposed rearward of the process unit 4 in the main body housing 2. Specifically, the fuser 9 is located between the rear cover 12 in the closed state and the process unit 4. The fuser 9 has a heating roller 91 and a pressurizing member 92. The heating roller 91 is configured to heat the sheet S. The pressurizing member 92 is configured to sandwich the sheet S between the pressurizing member 92 itself and the heating roller 91. In the illustrative embodiment, the heating roller 91 includes therein heaters 93 configured to heat the heating roller 91. The pressurizing member 92 includes an endless belt, a pressure pad, a holder, and a belt guide, which are shown with no reference numerals assigned. The pressure pad is configured to sandwich the endless belt between the pressure pad itself and the heating roller 91. The holder is configured to support the pressure pad.

The process unit 4 is configured to uniformly charge the surface of each photoconductive drum 61 by a corresponding charger 62 and expose the surface of each photoconductive drum 61 by the exposure device 5, thereby forming an electrostatic latent image on the surface of each photoconductive drum 61. The process unit 4 supplies toner stored in each toner container 73 to a corresponding supply roller 72, thereby supplying the toner from the supply roller 72 to a corresponding developing roller 71. The toner supplied to the developing roller 71 is carried on the developing roller 71 as the developing roller 71 rotates.

The process unit 4 supplies the electrostatic latent image formed on each photoconductive drum 61 with the toner carried on the corresponding developing roller 71, thereby forming a toner image on the surface of each photoconductive drum 61. Then, the process unit 4 transfers the toner image on each photoconductive drum 61 onto the sheet S as the conveyor 3 conveys the sheet S fed from the feed tray 31 between each photoconductive drum 61 and the conveyor belt 83. Thereafter, the sheet S with the toner images transferred thereon is conveyed from the process unit 4 to the fuser 9 by the process unit 4 and the conveyor 3.

The fuser 9 forms an image on the sheet S by fixing the transferred toner images onto the sheet S while conveying the sheet S between the heating roller 91 and the pressurizing member 92.

The printer 1 further includes a fixing fan 13 and a fuser temperature sensing device TH in the main body housing 2.

The fixing fan 13 is configured to, when driven, discharge air in the main body housing 2 out of the main body housing 2.

The fuser temperature sensing device TH is configured to output a signal according to a temperature of the fuser 9 (more specifically, a temperature of the heating roller 91). The fuser temperature sensing device TH is disposed at the fuser 9 and opposed to the heating roller 91 in a non-contact state. Practicable examples of the fuser temperature sensing device TH may include, but are not limited to, a non-contact thermistor.

Figure 2:
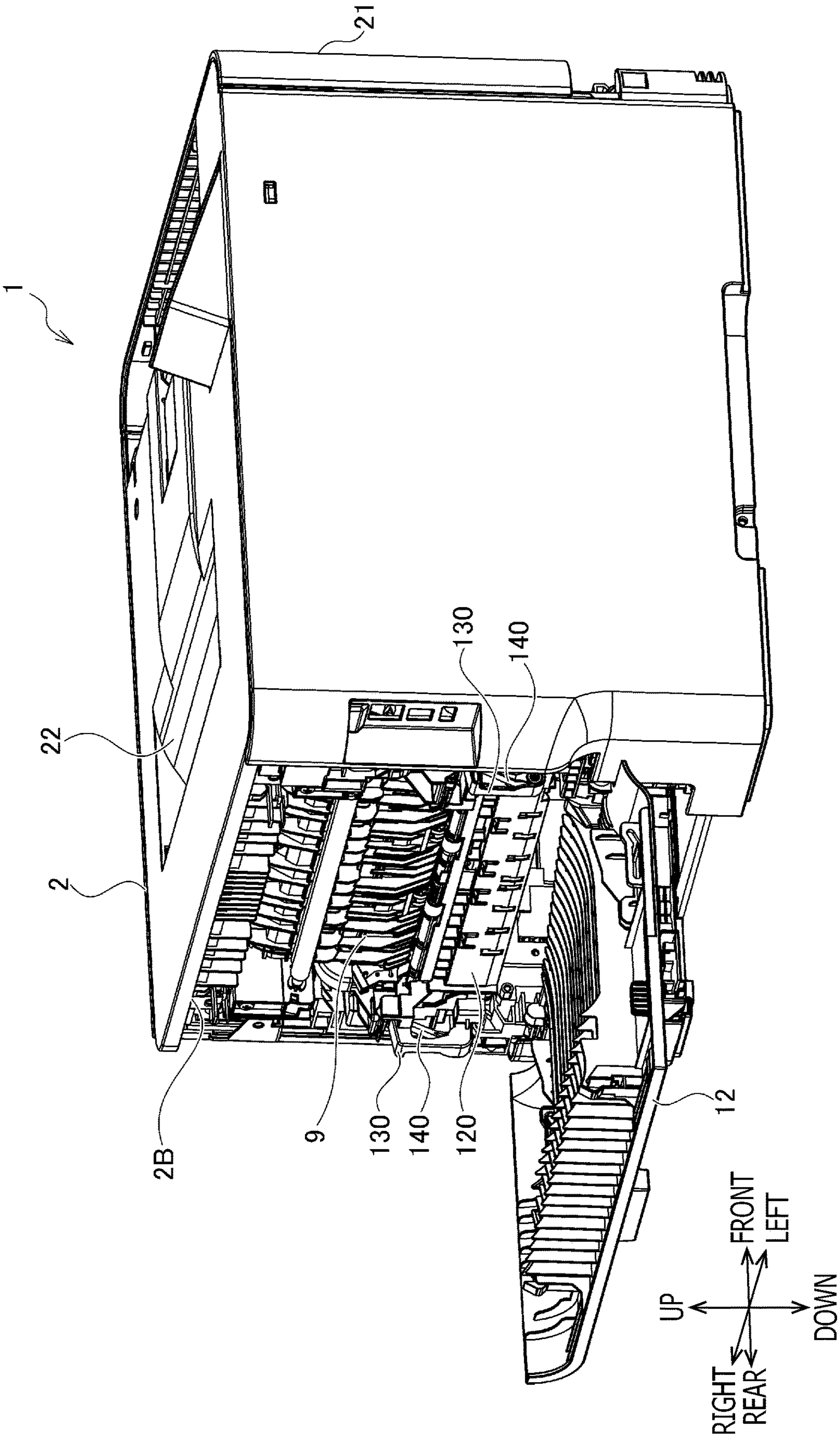
FIG. 2 is a perspective view showing the color laser printer with a rear cover open.

The fuser 9 is configured to be attached to and removed from the main body housing 2 through the rear opening 2B of the main body housing 2 that is opened when the rear cover 12 is opened. FIG. 2 shows the rear cover 12 opened. As shown in FIG. 2, the fuser 9 includes a fuser housing 120. The fuser 9 further includes a fixed handle 130 disposed at each of left and right end portions of the fuser housing 120. The fuser 9 further includes a lever 140 attached to each fixed handle 130.

Figure 3:
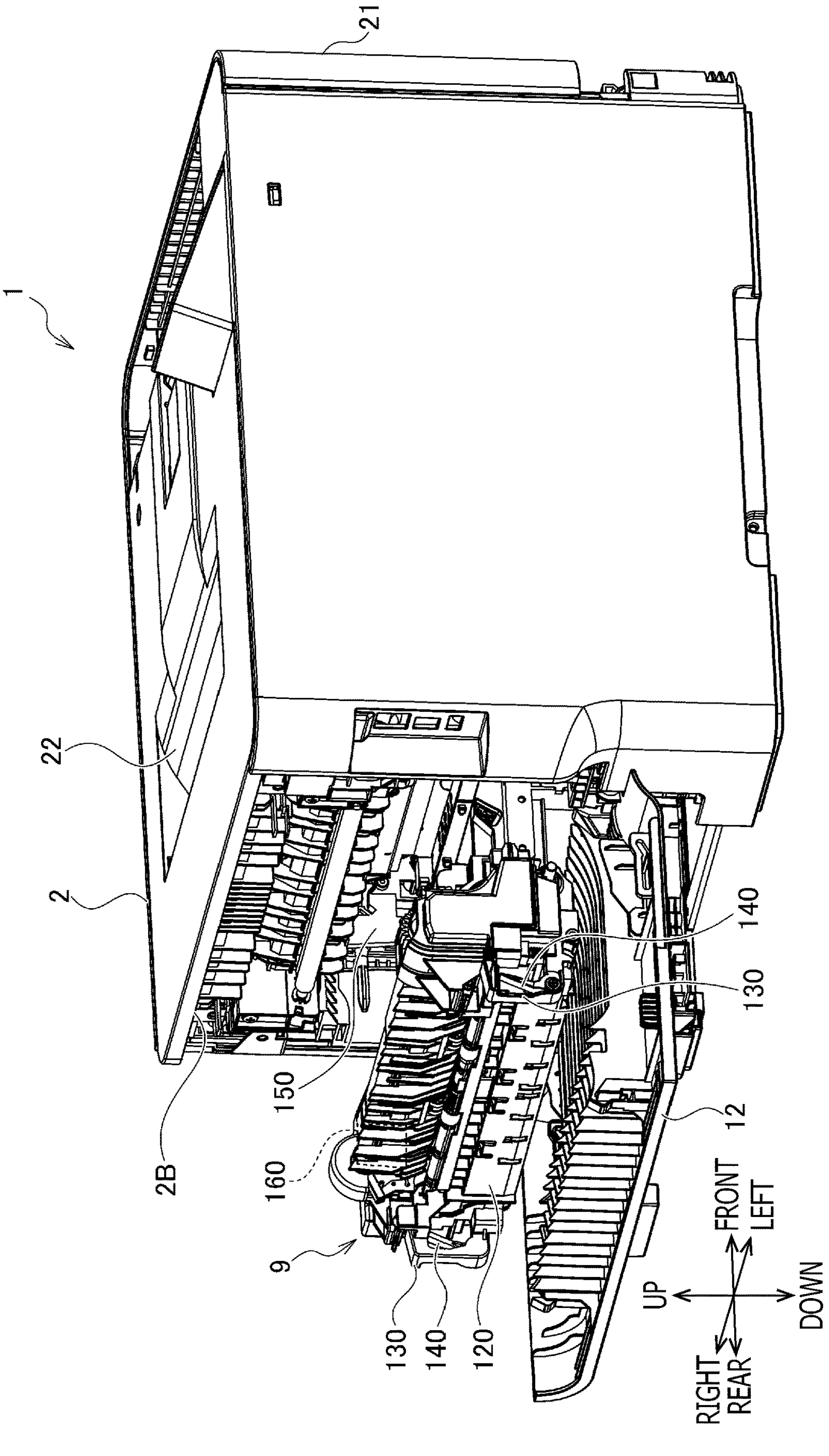
FIG. 3 is a perspective view showing the color laser printer with a fuser pulled out from the state shown in FIG. 2.

As shown in FIG. 3, the user is allowed to detach the fuser 9 from the main body housing 2 by pulling the fixed handles 130 rearward while grasping the levers 140. At this time, a fuser connector 160 disposed at the fuser 9 is also detached from a main body connector 150 disposed at the main body housing 2. Namely, the fuser connector 160 and the main body connector 150 are connected with each other when the fuser 9 is attached to the main body housing 2, and are disconnected when the fuser 9 is detached from the main body housing 2.

Figure 4:
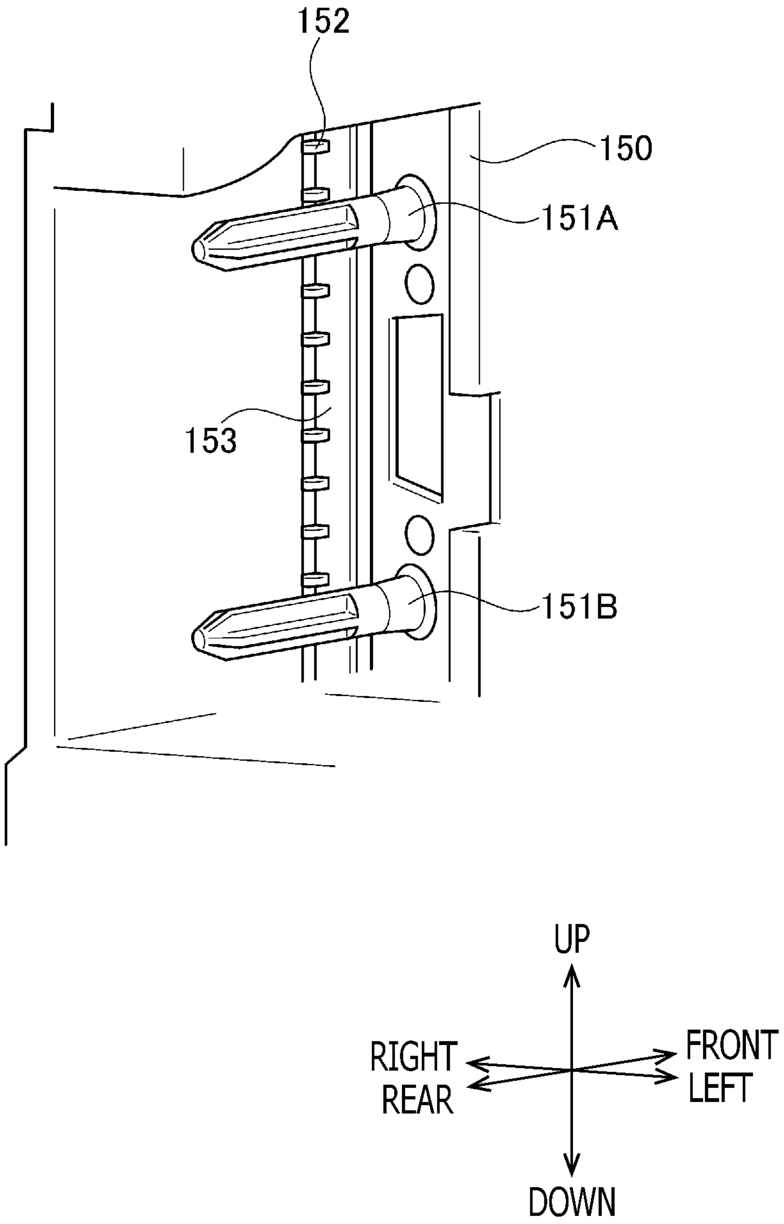
FIG. 4 is an enlarged perspective view showing a main body connector.

FIG. 4 is an enlarged perspective view of the main body connector 150 disposed at a right end section in the main body housing 2 (see FIG. 3). The right end section is an end section close to a right side face of the main body housing 2 in the left-right direction. Likewise, as will be described later, a left end section in the main body housing 2 is an end section close to a left side face of the main body housing 2 in the left-right direction. As shown in FIG. 4, the main body connector 150 includes positioning pins 151A and 151B arranged along the vertical directions and a socket 153 having a plurality of contacts 152. On the other hand, the fuser connector 160 includes, although a detailed configuration thereof is not shown in any drawings, recesses into which the positioning pins 151A, 151B are inserted and a plug having a contact configured to contact each of the contacts 152.

Figure 5:
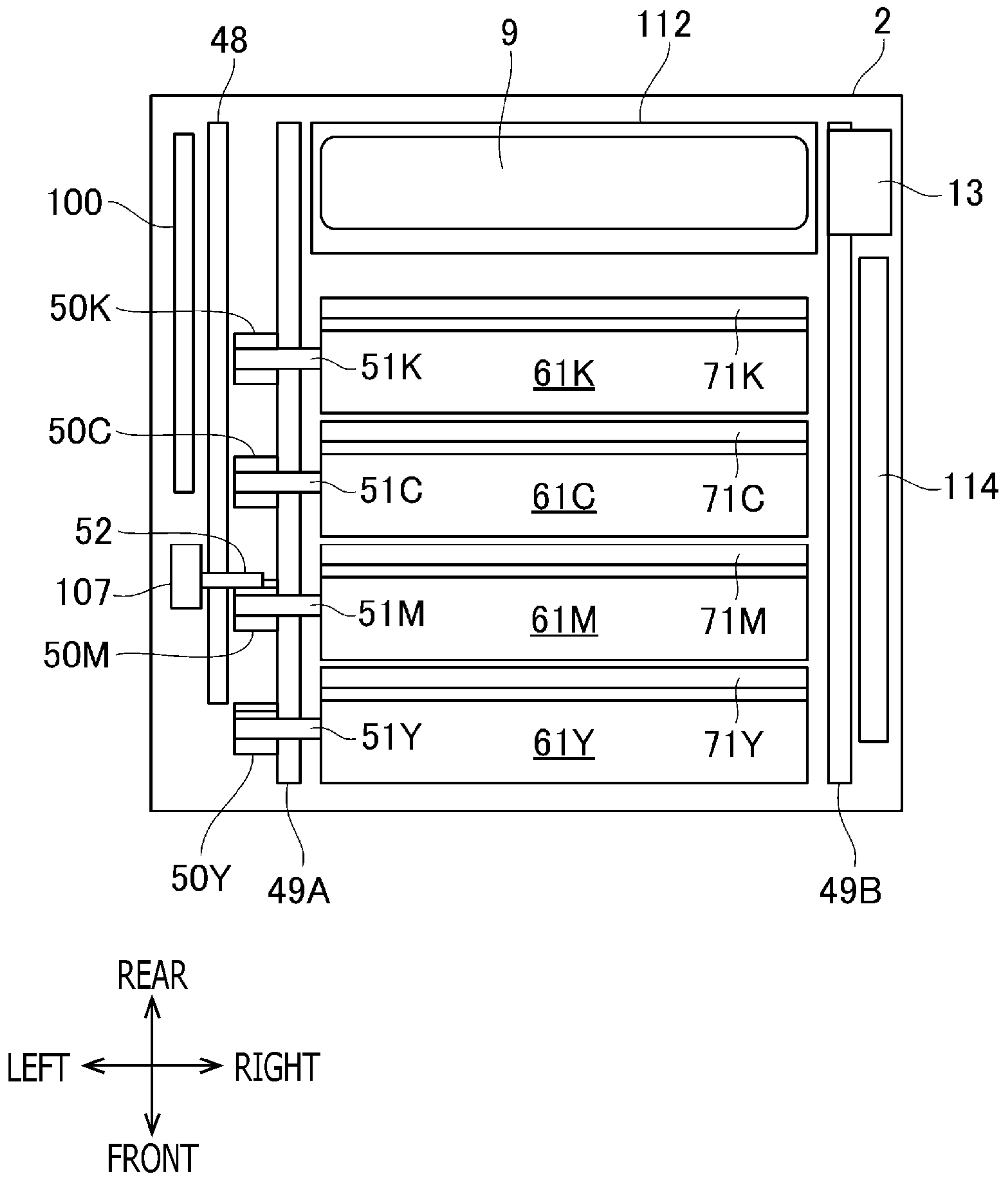
FIG. 5 is a plan view schematically showing an internal configuration of the color laser printer.

Next, an internal configuration of the printer 1 will be described with reference to FIGS. 5 and 6. In FIGS. 5 and 6, elements necessary to explain the illustrative embodiment are mainly described, and other elements of the printer 1 may be omitted.

As shown in FIG. 5, the printer 1 includes a metal frame 48, a first resin frame 49A, and a second resin frame 49B inside the main body housing 2.

As shown in FIG. 6, the first resin frame 49A, the second resin frame 49B, and a support frame 49C form a main body frame 49. The first resin frame 49A and the second resin frame 49B are connected with each other via the support frame 49C. Here, when each vertex of the first resin frame 49A and an opposed vertex of the second resin frame 49B are connected with each other, it forms a rectangular shape. Hereinafter, an inside of the rectangular shape may be referred to as an "inside of the main body frame 49." An outside of the rectangular shape may be referred to as an "outside of the main body frame 49." The metal frame 48 is grounded. The first resin frame 49A, the second resin frame 49B, and the support frame 49C are made of resin, but may be made of other materials such as metal.

As shown in FIG. 5, inside the main body frame 49, the developing rollers 71Y to 71K, the photoconductive drums 61Y to 61K, the fuser 9, and an AC-DC power supply board 112 are disposed.

At the first resin frame 49A, gears 50Y to 50K are disposed that correspond to the photoconductor drums 61Y to 61K, respectively. The gears 50Y to 50K have shafts 51Y to 51K, respectively. Each of the shafts 51Y to 51K is inserted into the first resin frame 49A in the left-right direction. A distal end of each of the shafts 51Y to 50K is attached to a corresponding one of the photoconductor drums 61Y to 61K.

As shown in FIG. 6, a main board 100, a main motor 106, and a process motor 107 are disposed on a left side face of the metal frame 48. Namely, the main board 100, the main motor 106, and the process motor 107 are located on a left side outside the main body frame 49. The main motor 106 is mounted on a main motor board 106A. The process motor 107 is mounted on a process motor board 107A. The main board 100 is connected with the main motor board 106A via a first motor harness MHR1. The main board 100 is connected with the process motor board 107A via a second motor harness MHR2.

As shown in FIG. 5, the process motor 107 is configured to rotate a process motor shaft 52 provided at the metal frame 48 to transmit a driving force from the process motor 107 to the gears 50. When the gears 50 are driven, the shafts 51 rotate, and the photoconductive drums 61 and the developing rollers 71 rotate according to the rotations of the shafts 51.

The fixing fan 13 is disposed at the second resin frame 49B. A high-voltage power supply board 114 is disposed on a right side face of the second resin frame 49B. Namely, the fixing fan 13 and the high-voltage power supply board 114 are located at a right portion in the main body frame 49. The high-voltage power supply board 114 is configured to supply high voltages, such as a developing voltage and a charging voltage, to the process unit 4.

Thus, a left portion in the main body frame 49 is crowded since a driving system including the motors 106 and 107 and the gears 50 is disposed there. However, the main board 100 has to be disposed at the left portion in the main body frame 49 since the main board 100 needs be placed near the motors 106 and 107. In contrast, the right portion in the main body frame 49 is relatively less crowded, although the high-voltage power supply board 114 is disposed there. Therefore, the main body connector 150 is disposed at the right portion in the main body frame 49, i.e., at the right end section close to the right side face of the main body housing 2. Thereby, the position of the fuser connector 160 is inevitably determined. Specifically, the fuser connector 160 is disposed in such a position as to be connected with the main body connector 150 when the fuser 9 is attached to the main body housing 2. Namely, the fuser connector 160 is located at a right end portion of the fuser housing 120 as shown in FIG. 3.

As shown in FIG. 6, the main board 100 and the high-voltage power supply board 114 are connected with each other via a first connection line CA1. The main board 100 has a controller 101 (see FIG. 8) mounted thereon that is configured to control the high-voltage power supply board 114. Therefore, control signals need to be exchanged between the main board 100 and the high-voltage power supply board 114. The first connection line CA1 is used to transmit such control signals. Since there are a plurality of types of control signals, there are a plurality of signal lines to transmit such a plurality of types of control signals. Therefore, the first connection line CA1 is formed by a harness that bundles the plurality of signal lines. Furthermore, a flat cable is adopted as a cable shape of the first connection line CA1. The flat cable is adopted to reduce the size of the fuser housing 120 by reducing the volume of the cable path as much as possible.

As described above, the main board 100 is disposed at the left portion in the main body frame 49 and the high-voltage power supply board 114 is disposed at the right portion in the main body frame 49. Therefore, the first connection line CA1 connecting the main board 100 and the high-voltage power supply board 114 needs to traverse the main body frame 49 in the left-right direction.

Figure 7:
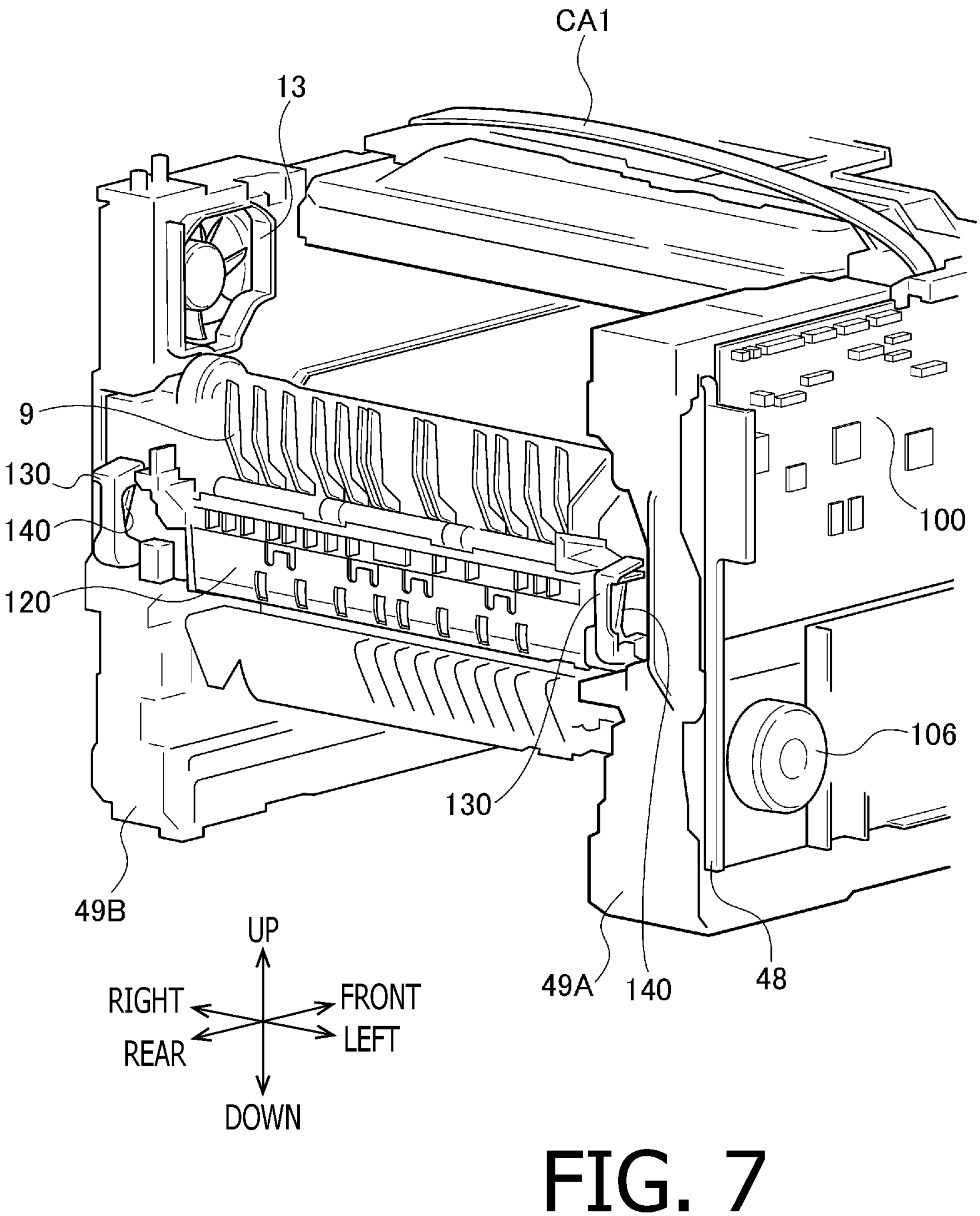
FIG. 7 is an example perspective view showing where a first connection line is disposed in a main body housing of the color laser printer.

FIG. 7 shows an example indicating through which location in the main body housing 2 the first connection line CA1 traverses the main body frame 49 in the left-right direction. In the example shown in FIG. 7, the first connection line CA1 is disposed along a ceiling surface in the main body housing 2, more specifically, above the process unit 4 in the main body housing 2. The location of the first connection line CA1 is not limited to the above example. The first connection line CA1 may be disposed along a bottom surface in the main body housing 2, more specifically, below the feed tray 31 and the conveyor 3 in the main body housing 2.

As shown in FIG. 6, the AC-DC power supply board 112 is disposed at a rear section close to a bottom surface in the main body frame 49, below the fuser 9, in such a manner as to be laid parallel to the bottom surface of the main body frame 49 and along the left-right directions. The AC-DC power supply board 112 includes an AC-DC conversion circuit (not shown). The AC-DC power supply board 112 is configured to receive an input of AC voltage (e.g., 100 V AC) from a commercial power supply and convert 100 V AC into DC voltage (e.g., 24 V DC) through the AC-DC conversion circuit. The AC-DC power supply board 112 is connected with the main board 100 via a fourth connection line CA4. The AC-DC power supply board 112 is further configured to output the generated 24 V DC to the main board 100. It is noted that “AC” is an abbreviation for “alternating-current” and that “DC” is an abbreviation for “direct-current.”

The main board 100 includes a DC-DC conversion circuit (not shown). The main board 100 is configured to convert 24 V DC supplied from the AC-DC power supply board 112 into, for instance, 3.3 V DC through the DC-DC conversion circuit. This 3.3 V DC is used to drive various electronic components mounted on the main board 100. However, if there are electronic components to be driven by other DC voltages (e.g., 5 V DC), a plurality of DC-DC conversion circuits may be provided to generate DC voltages of other voltage values (e.g., 5 V DC), in addition to 3.3 V DC.

The AC-DC power supply board 112 is connected with the main body connector 150 via a third connection line CA3, and is connected with an inlet 200 (see FIG. 8) via a fifth connection line CA5. Commercial voltage is supplied from the AC-DC power supply board 112 to the fuser 9 via the third connection line CA3. The inlet 200 is used to input the commercial voltage. The commercial voltage is input from the inlet 200 to the AC-DC power supply board 112 via the fifth connection line CA5. The inlet 200 is disposed at a rear end portion of the second resin frame 49B. Accordingly, AC voltage is input from the commercial power supply into a right end portion, close to the right side face of the main body housing 2, of the AC-DC power supply board 112. Then, DC voltage is output from a left end portion, close to the left side face of the main body housing 2, of the AC-DC power supply board 112, and is supplied to the main board 100 located at the left end section close to the left side face of the main body housing 2, via the fourth connection line CA4. The main board 100 is driven by the supplied DC voltage.

Figure 8:
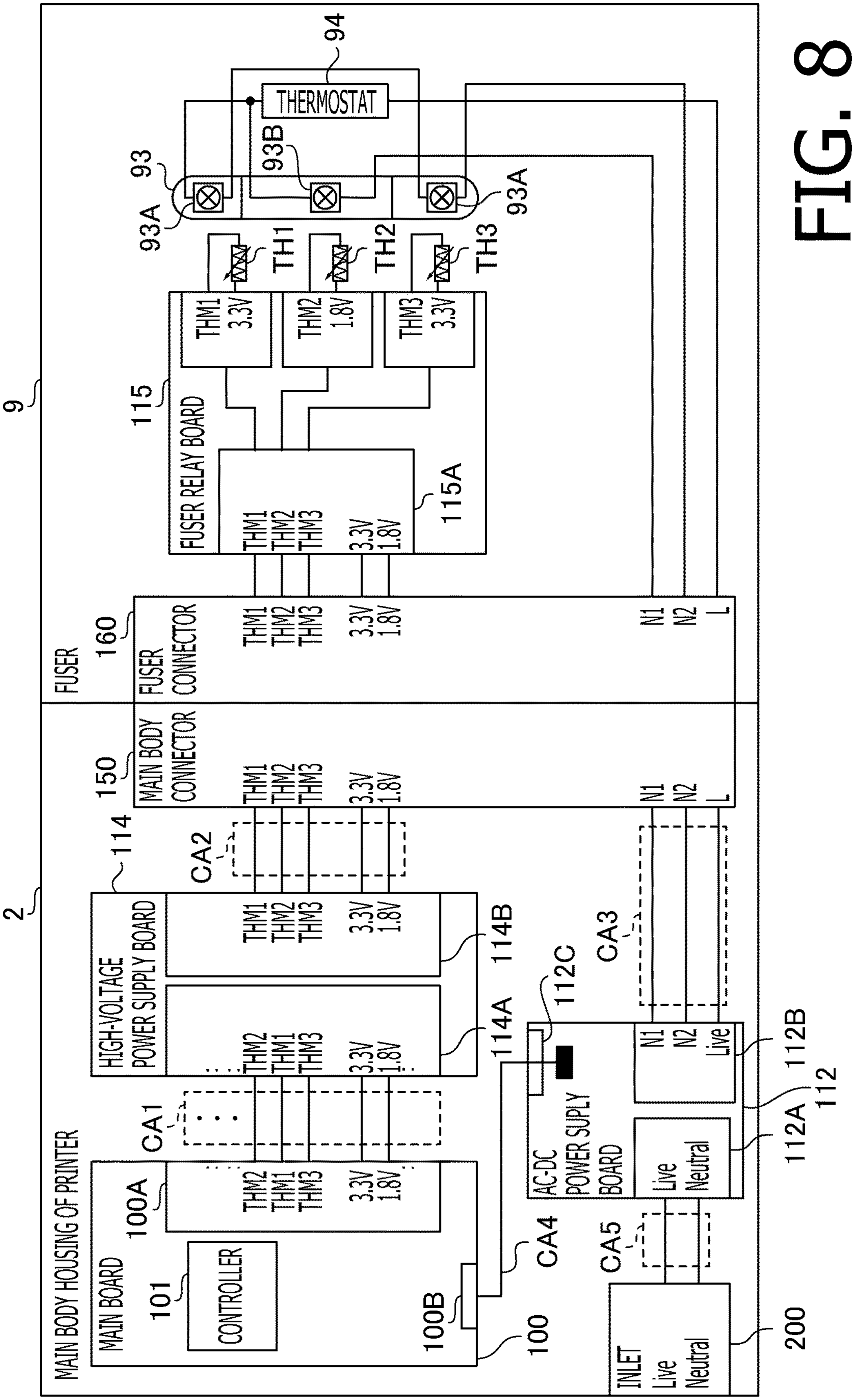
FIG. 8 is a block diagram showing transmission paths for some signals including power supply voltage between boards in the main body housing and a board in the fuser.

FIG. 8 shows transmission paths for some signals between a fuser relay board 115 in the fuser 9 and the various boards 100, 112, and 114 in the main body housing 2.

As shown in FIG. 8, the main board 100 includes the controller 101. For instance, the controller 101 includes a CPU, a ROM, a RAM, and input/output circuits. The controller 101 is configured to perform various types of arithmetic processing based on programs and data stored in the ROM, thereby taking overall control of the printer 1 including the process unit 4.

The main board 100 is connected with the high-voltage power supply board 114 via a connector 100A on the main board 100 side, the first connection line CA1, and a connector 114A on the high-voltage power supply board 114 side. The high-voltage power supply board 114 is connected with the main body connector 150 via a connector 114B on the high-voltage power supply board 114 side, and the second connection line CA2. Furthermore, the main board 100 is connected with the AC-DC power supply board 112 via a connector 100B on the main board 100 side, the fourth connection line CA4, and a connector 112C on the AC-DC power supply board 112 side.

The main body housing 2 includes an inlet 200. The commercial voltage supplied from the inlet 200 is input into the AC-DC power supply board 112 via a connector 112A on the AC-DC power supply board 112 side. The AC-DC power supply board 112 is connected with the main body connector 150 via a connector 112B on the AC-DC power supply board 112 side, and the third connection line CA3.

The main body connector 150 is connected with the fuser connector 160. The fuser connector 160 is connected with the fuser relay board 115 via a connector 115A on the fuser relay board 115 side. As described above, the fuser 9 includes the heaters 93. In the example shown in FIG. 8, the heaters 93 include two heaters 93A and 93B. Each of the heaters 93A and 93B is supplied with the commercial voltage (e.g., 100 V AC) supplied from the inlet 200 via the AC-DC power supply board 112, the third connection line CA3, the main body connector 150, and the fuser connector 160.

Each of the heaters 93A and 93B is heated by the 100 V AC thus supplied. A thermostat 94 for preventing overheating of the heaters 93A and 93B is disposed in a path where the 100 V AC is supplied to the heaters 93A and 93B. When the 100 V AC is supplied to each of the heaters 93A and 93B, the controller 101 controls a heating temperature of each of the heaters 93A and 93B by controlling on/off timing of the 100 V AC supplied to each of the heaters 93A and 93B. To control the heating temperature, the fuser temperature sensing device TH is provided as described above. In the example shown in FIG. 8, the fuser temperature sensing device TH includes three temperature sensors TH1 to TH3. The temperature sensors TH1 to TH3 are disposed at such locations that the temperature sensors TH1 to TH3 are enabled to detect a temperature of a left end portion, a temperature of a middle portion, and a temperature of a right end portion of the heating roller 91 elongated along the left-right directions, respectively.

The temperature sensors TH1 and TH2, for detecting the temperature of the left end portion and the temperature of the right end portion of the heating roller 91, respectively, are supplied with 3.3 V DC from the fuser relay board 115, and operate with this 3.3 V DC. Meanwhile, the temperature sensor TH2 for detecting the temperature of the middle portion of the heating roller 91 is supplied with 1.8 V DC, and operates with this 1.8 V DC. One reason for using the temperature sensors TH1 to TH3 with different operating voltages is that it is desirable to keep some (in this example, the temperature sensor TH2) of the temperature sensors TH1 to TH3 in operation even when the printer 1 is brought into a sleep mode in which the supply of 3.3 V DC is stopped while the supply of 1.8 V DC is maintained.

As described above, the controller 101 of the main board 100 is configured to control the heating temperature of each of the heaters 93A and 93B. Therefore, signals THM1 to THM3 corresponding to temperatures detected by the temperature sensors TH1 to TH3, respectively, i.e., signals THM1 to THM3 detected in the fuser 9 need to be transmitted from the fuser 9 to the main board 100. As described above, in this case, a new connection line needs to be provided to connect the main body connector 150 and the main board 100. However, the main body connector 150 is disposed at the right end section close to the right side face of the main body housing 2, and the main board 100 is disposed at the left end section close to the left side face of the main body housing 2. Therefore, the new connection line needs to traverse the main body frame 49 in the left-right direction in substantially the same manner as the first connection line CA1. Nonetheless, there is not enough room in the main body housing 2 to place a further connection line traversing the main body frame 49 in the left-right direction, in addition to the first connection line CA1. Thus, in the illustrative embodiment, signal lines for transmitting the signals THM1 to THM3 detected in the fuser 9 are included in the first connection line CA1. Thereby, it is possible to transmit the signals THM1 to THM3 detected in the fuser 9 to the main board 100 simply by newly providing a short connection line (i.e., the second connection line CA2) for connecting the main board connector 150 and the high-voltage power supply board 114 located near the main board connector 150.

As shown in FIG. 8, the signals THM1 to THM3 are transmitted to the main board 100 via the fuser relay board 115, the fuser connector 160, the main body connector 150, the second connection line CA2, the high-voltage power supply board 114, and the first connection line CA1. The controller 101 on the main board 100 controls the on/off timing of the 100 V AC supplied to each of the heaters 93A and 93B based on the signals THM1 to THM3 output from the temperature sensors TH1 to TH3. The second connection line CA2 includes a plurality of signal lines to transmit a plurality of signals in substantially the same manner as the first connection line CA1. Specifically, the second connection line CA2 is formed by a harness that bundles a plurality of signal lines in substantially the same manner as the first connection line CA1.

The AC-DC power supply board 112 includes an on/off circuit configured to turn on and off the supply of 100 V AC to each of the heaters 93A and 93B. Specifically, for instance, the AC-DC power supply board 112 has a circuit including a triac (not shown). The AC-DC power supply board 112 further includes a relay (not shown) configured to turn on and off the input of 100 V AC. The controller 101 is configured to control both the on/off circuit and the relay. Therefore, control signal lines for transmitting the respective control signals for the on/off circuit and the relay are included in the fourth connection line CA4 connecting the main board 100 and the AC-DC power supply board 112. In addition, a power supply line of the AC-DC power supply board 112, which is configured to transmit the generated 24 V DC to the main board 100 as described above, is also included in the fourth connection line CA4.

The above explanation with reference to FIG. 8 has focused mainly on the transmission, between the fuser 9 and the main board 100, of the signals THM1 to THM3 corresponding to the temperature detected by the temperature sensors TH1 to TH3, respectively. Therefore, only the signals THM1 to THM3 and the power supply voltage have been described as signals flowing through the first connection line CA1. However, the signals flowing through the first connection line CA1 are not limited to these, but also include, needless to say, signals for controlling the process unit 4. The signals for controlling the process unit 4 may be included in examples of a "first signal" according to aspects of the present disclosure. The signals THM1 to THM3 may be included in examples of a "second signal" according to aspects of the present disclosure.

As described above, the printer 1 in the illustrative embodiment includes the main body housing 2, the process unit 4, the main body connector 150, the fuser 9, the high-voltage power supply board 114, and the main board 100. The process unit 4 is configured to form developer images on a sheet S. The main body connector 150 is disposed at the right end section close to the right side face of the main body housing 2. The fuser 9 is configured to thermally fix the developer images formed on the sheet S. The fuser 9 is further configured to be removably attached to the main body housing 2. The fuser 9 includes the heating roller 91 having the heaters 93. The fuser 9 further includes the pressurizing member 92 configured to sandwich the sheet S in pressure contact between the pressurizing member 92 itself and the heating roller 91. The fuser 9 further includes the fuser connector 160 configured to connect with the main body connector 150 when the fuser 9 is attached to the main body housing 2. The high-voltage power supply board 114 is configured to generate voltage to be applied to the process unit 4. The high-voltage power supply board 114 is disposed at the right end section close to the right side face of the main body housing 2 in such a manner that a board surface of the high-voltage power supply board 114 is parallel to the right side face of the main body housing 2. The main board 100 includes the controller 101 configured to control the process unit 4. The main board 100 is disposed at the left end section close to the left side face, which is opposed to the right side face in the left-right direction, of the main body housing 2 in such a manner that a board surface of the main board 100 is parallel to the left side face of the main body housing 2.

The fuser connector 160 is located at the right end section close to the right side face of the main body housing 2 when the fuser 9 is attached to the main body housing 2. The main board 100 and the high-voltage power supply board 114 are connected with each other via the first connection line CA1 disposed close to and along the ceiling surface or the bottom surface in the main body housing 2. The high-voltage power supply board 114 and the main body connector 150 are connected with each other via the second connection line CA2. The main board 100 is connected with the fuser 9 via the first connection line CA1, the high-voltage power supply board 114, the second connection line CA2, the main body connector 150, and the fuser connector 160.

Thus, in the printer 1 of the illustrative embodiment, the main board 100 is connected with the fuser 9 via the first connection line CA1, the high-voltage power supply board 114, the second connection line CA2, the main body connector 150, and the fuser connector 160. This makes it possible to omit a connection line for connecting the main board 100 and the main body connector 150. Hence, it is possible to downsize the main body housing 2 since there is no need for a path for a connection line connecting the main board 100 and the main body connector 150.

The process unit 4 includes the photoconductive drums 61, the chargers 62, and the exposure device 5. Each of the chargers 62 is configured to charge a corresponding one of the photoconductive drums 61. The exposure device 5 is disposed at an upper end section close to the ceiling surface in the main body housing 2. The exposure device 5 is configured to form an electrostatic latent image on each of the photoconductive drums 61 charged by the chargers 62. The first connection line CA1 is disposed above the process unit 4 in the main body housing 2.

Thus, it is possible to suppress the increase in size of the main body housing 2 since the first connection line CA1 is disposed in a vacant space inside the main body housing 2.

The printer 1 further includes the feed tray 31 and the conveyor 3. The feed tray 31 is configured to support sheets S placed thereon. The conveyor 3 is configured to convey the sheets S from the feed tray 31 to the process unit 3. The first connection line CA1 is disposed below the feed tray 31 and the conveyor 3.

Thus, it is possible to suppress the increase in size of the main body housing 2 since the first connection line CA1 is disposed in a vacant space inside the main body housing 2.

The printer 1 further includes the AC-DC power supply board 112 configured to receive an input of AC voltage from the commercial power supply and output the AC voltage to the heaters 93 via the main body connector 150 and the fuser connector 160. A board surface of the AC-DC power supply board 112 is disposed parallel to the bottom surface of the main body housing 2. A portion, close to one of the left and right side faces, of the board surface of the AC-DC power supply board 112 is connected with the main body connector 150 via the third connection line CA3.

Thereby, it is possible to achieve a shortened length of the third connection line CA3.

The main board 100 and the AC-DC power supply board 112 are connected with each other through the fourth connection line CA4. The AC-DC power supply board 112 is configured to turn on and off the AC voltage output therefrom. More specifically, the AC-DC power supply board 112 includes a switching device (not shown) configured to turn on and off the AC voltage output. The main board 100 is configured to cause, via the fourth connection line CA4, the AC-DC power supply board 112 (more specifically, the switching device) to turn on and off the AC voltage output.

Thereby, it is possible to include signals for turning the switching device on and off in the fourth connection line CA4. The triac and the relay of AC-DC power supply board 112 may be included in examples of the "switching device" according to aspects of the present disclosure.

The main board 100 and the AC-DC power supply board 112 are connected with each other through the fourth connection line CA4. The AC-DC power supply board 112 is configured to convert AC voltage to DC voltage. More specifically, the AC-DC power supply board 112 includes the AC-DC conversion circuit (not shown) configured to convert AC voltage to DC voltage. Thereby, the AC-DC power supply board 112 is enabled to receive an input of AC voltage from a commercial power supply located close to the right side face of the main body housing 2 and output DC voltage toward the left side face of the main body housing 2. Then, the DC voltage is supplied to the main board 100 located close to the left side face of the main body housing 2 via the fourth connection line CA4.

Thereby, it is possible to achieve a shortened length of the fourth connection line CA4.

The first connection line CA1 is a first harness configured to transmit and receive a plurality of types of signals therethrough. The plurality of types of signals include at least a first signal for the controller 101 to control the process unit 4 and a second signal for the controller 101 to control the fuser 9. The second connection line CA2 is a second harness configured to transmit and receive the second signal therethrough. The second signal is transmitted and received between the main board 100 and the fuser 9 via the fuser connector 160, the main body connector 150, the second harness, the high-voltage power supply board 114, and the first harness.

Thus, the single first harness is enabled to transmit and receive therethrough a plurality of types of signals including the first signal and the second signal. The single second harness is enabled to transmit and receive therethrough a plurality of types of signals including the second signal. Therefore, it is possible to reduce the number of harnesses.

The fuser 9 includes a fuser temperature sensor TH configured to output a temperature signal corresponding to the temperature of the heating roller 91. The temperature signal output from the fuser temperature sensor TH is transmitted to the main board 100 via the fuser connector 160, the main body connector 150, the second harness, the high-voltage power supply board 114, and the first harness.

Thereby, it is possible to downsize the main body housing 2 since there is no need for a path for a connection line connecting the main board 100 and the main body connector 150.

The first connection line CA1 is a flat cable.

Thereby, it is possible to reduce the size of the fuser housing 120 by reducing the volume of the cable path as much as possible.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

In the aforementioned illustrative embodiment, the color laser printer 1 has been described as an example of an "image forming apparatus" according to aspects of the present disclosure. However, practicable examples of the "image forming apparatus" are not limited to this, but may include a monochrome laser printer. Further, practicable examples of the "image forming apparatus" are not limited to printers, but may include a multi-function peripheral and a copy machine.

In the aforementioned illustrative embodiment, an example has been described in which the main body connector 150 and the fuser connector 160 are disposed at the right end section close to the right side face of the main body housing 2. This is merely because the right end section close to the right side face of the main body housing 2, i.e., the right portion in the main body frame 49 is less crowded than the left portion. Namely, the main body connector 150 and the fuser connector 160 may be disposed at the left end section close to the left side face of the main body housing 2 if the left end section close to the left side face of the main body housing 2, i.e., the left portion in the main body frame 49 is less crowded than the right portion.

The following shows examples of associations between elements illustrated in the aforementioned illustrative embodiment(s) and modification(s), and elements claimed according to aspects of the present disclosure. For instance, the printer 1 may be an example of an "image forming apparatus" according to aspects of the present disclosure. The main body housing 2 may be an example of a "main body housing" according to aspects of the present disclosure. The process unit 4 may be an example of an "image forming engine" according to aspects of the present disclosure. The photoconductive drums 61 may be included in examples of a "photoconductive drum" according to aspects of the present disclosure. The chargers 62 may be included in examples of a "charger" according to aspects of the present disclosure. The exposure device 5 may be an example of an "exposure device" according to aspects of the present disclosure. The fuser 9 may be an example of a "fuser" according to aspects of the present disclosure. The heating roller 91 may be an example of a "heating member" according to aspects of the present disclosure. The heaters 93 may be included in examples of a "heater" according to aspects of the present disclosure. The pressurizing member 92 may be an example of a "pressurizing member" according to aspects of the present disclosure. The fuser connector 160 may be an example of a "fuser connector" according to aspects of the present disclosure. The feed tray 31 may be an example of a "feed tray" according to aspects of the present disclosure. The conveyor 3 may be an example of a "conveyor" according to aspects of the present disclosure. The main body connector 150 may be an example of a "main body connector" according to aspects of the present disclosure. The high-voltage power supply board 114 may be an example of a "power supply board" according to aspects of the present disclosure. The AC-DC power supply board 112 may be an example of a "second power supply board" according to aspects of the present disclosure. The main board 100 may be an example of a "main board" according to aspects of the present disclosure. The controller 101 may be an example of a "controller" according to aspects of the present disclosure. The first connection line CA1 may be an example of a "first connection line" according to aspects of the present disclosure. The second connection line CA2 may be an example of a "second connection line" according to aspects of the present disclosure. The third connection line CA3 may be an example of a "third connection line" according to aspects of the present disclosure. The fourth connection line CA4 may be an example of a "fourth connection line" according to aspects of the present disclosure.

What is claimed is:

1. An image forming apparatus comprising:

a main body housing;

an image forming engine configured to form a developer image on a sheet;

a main body connector disposed at a first end section in the main body housing, the first end section being an end section close to a first side face of the main body housing in a particular direction;

a fuser configured to be removably attached to the main body housing and to thermally fix the developer image formed on the sheet, the fuser comprising:

a heating member having a heater;

a pressurizing member configured to sandwich the sheet in pressure contact between the pressurizing member and the heating member; and a fuser connector configured to connect with the main body connector when the fuser is attached to the main body housing, the fuser connector being disposed at the first end section in the main body housing when the fuser is attached to the main body housing;

a power supply board configured to generate voltage to be applied to the image forming engine, the power supply board being disposed at the first end section in the main body housing in such a manner that a board surface of the power supply board is parallel to the first side face of the main body housing;

a main board having a controller configured to control the image forming engine, the main board being disposed at a second end section in the main body housing, in such a manner that a board surface of the main board is parallel to a second side face of the main body housing, the second end section being an end section close to the second side face of the main body housing in the particular direction, the second side face being opposed to the first side face in the particular direction;

a first connection line configured to connect the main board and the power supply board with each other, the first connection line being disposed close to and along a ceiling surface or a bottom surface in the main body housing; and a second connection line configured to connect the power supply board and the main body connector with each other, wherein the main board is connected with the fuser via the first connection line, the power supply board, the second connection line, the main body connector, and the fuser connector.

2. The image forming apparatus according to claim 1, wherein the image forming engine comprises:

a photoconductive drum;

a charger configured to charge the photoconductive drum; and an exposure device disposed at an upper end section in the main body housing, the upper end section being an end section close to the ceiling surface in the main body housing in a vertical direction, the exposure device being configured to form an electrostatic latent image on the charged photoconductive drum, and wherein the first connection line is disposed above the image forming engine.

3. The image forming apparatus according to claim 1, further comprising:

a feed tray configured to support the sheet placed thereon; and a conveyor configured to convey the sheet from the feed tray to the image forming engine, wherein the first connection line is disposed below the feed tray and the conveyor.

4. The image forming apparatus according to claim 1, further comprising:

a second power supply board configured to receive an input of alternating-current (AC) voltage from a power supply and output the AC voltage to the heater via the main body connector and the fuser connector, the second power supply board being disposed in such a manner that a board surface thereof is parallel to the bottom surface of the main body housing; and a third connection line configured to connect an end portion of the board surface of the second power supply board with the main body connector.

5. The image forming apparatus according to claim 4, further comprising a fourth connection line configured to connect the main board and the second power supply board with each other, wherein the second power supply board is configured to turn on and off the AC voltage output therefrom, and wherein the main board is configured to cause, via the fourth connection line, the second power supply board to turn on and off the AC voltage output.

6. The image forming apparatus according to claim 4, further comprising a fourth connection line configured to connect the main board and the second power supply board with each other, wherein the second power supply board is configured to:

receive, from the power supply, the AC voltage input into a first end portion of the second power supply board, the first end portion being an end portion of the second power supply board that is close to the first side face of the main body housing in the particular direction;

convert the received AC voltage into direct-current (DC) voltage;

output the DC voltage from a second end portion of the second power supply board, the second end portion being an end portion of the second power supply board that is close to the second side face of the main body housing in the particular direction; and supply, via the fourth connection line, the DC voltage to the main board disposed at the second end section in the main body housing.

7. The image forming apparatus according to claim 1, wherein the first connection line is a first harness configured to transmit a plurality of types of signals therethrough, the plurality of types of signals including a first signal for the controller to control the image forming engine, and a second signal for the controller to control the fuser, wherein the second connection line is a second harness configured to transmit the second signal therethrough, and wherein the second signal is transmitted between the fuser and the main board via the fuser connector, the main body connector, the second harness, the power supply board, and the first harness.

8. The image forming apparatus according to claim 7, wherein the fuser comprises a temperature sensor configured to detect a temperature of the heater and output a temperature signal corresponding to the detected temperature of the heater, the output temperature signal being transmitted to the main board via the fuser connector, the main body connector, the second harness, the power supply board, and the first harness.

9. The image forming apparatus according to claim 7, wherein a flat cable is adopted as a cable shape of the first connection line.

* * * * *